United States Patent
Guwang et al.

(10) Patent No.: US 8,418,539 B2
(45) Date of Patent: Apr. 16, 2013

(54) METHOD AND CIRCUIT FOR PROCESSING A SIGNAL SUPPLIED BY A PIEZOELECTRIC SENSOR, AND PRESSURE-MEASURING DEVICE FOR PISTON ENGINE

(75) Inventors: Marcel Guwang, Lacroix-Falgarde (FR); Alain Ramond, Merville (FR)

(73) Assignee: HIDRIA AET d.o.o., Tolmin (SI)

( * ) Notice: Subject to any disclaimer, the term of this patent is extended or adjusted under 35 U.S.C. 154(b) by 55 days.

(21) Appl. No.: 13/229,179

(22) Filed: Sep. 9, 2011

(65) Prior Publication Data

US 2012/0060595 A1    Mar. 15, 2012

Related U.S. Application Data

(60) Provisional application No. 61/422,746, filed on Dec. 14, 2010.

(30) Foreign Application Priority Data

Sep. 10, 2010 (FR) ..................................... 10 03624

(51) Int. Cl.
  *G01M 15/08* (2006.01)
(52) U.S. Cl.
  USPC ...................................................... 73/114.18
(58) Field of Classification Search ................ 73/114.18
  See application file for complete search history.

(56) References Cited

U.S. PATENT DOCUMENTS

| | | | |
|---|---|---|---|
| 4,760,345 A | 7/1988 | Busser et al. | |
| 4,962,328 A | 10/1990 | Woss et al. | |
| 5,062,294 A * | 11/1991 | Iwata | 73/114.21 |
| 7,757,545 B2 * | 7/2010 | Sato et al. | 73/114.16 |
| 8,297,114 B2 * | 10/2012 | Ramond et al. | 73/114.16 |
| 2009/0153337 A1 * | 6/2009 | Cordesses et al. | 340/632 |
| 2011/0264392 A1 * | 10/2011 | Ramond et al. | 702/98 |

FOREIGN PATENT DOCUMENTS

| | | |
|---|---|---|
| DE | 33 30 043 A1 | 3/1984 |
| DE | 195 06 134 A1 | 9/1995 |
| EP | 0 253 016 A1 | 1/1988 |
| EP | 1 460 402 A2 | 9/2004 |
| FR | 2 922 261 A1 | 4/2009 |
| WO | 2010/057571 A1 | 5/2010 |

OTHER PUBLICATIONS

French Search Report, dated May 20, 2011, from corresponding French application.

* cited by examiner

*Primary Examiner* — Freddie Kirkland, III
(74) *Attorney, Agent, or Firm* — Young & Thompson (57) ABSTRACT

A method and a circuit for processing a signal supplied by a piezoelectric sensor (10) indicating the cylinder pressure of a piston engine such as a heat engine. Undesirable variations in the value of the signal supplied by the sensor and corresponding to plateaux in the pressure are compensated by a closed-loop servo control which is suitable for setting an output signal to a predetermined constant reference value, independently of undesirable variations in the signal from the sensor (10). The value of the output signal is sampled, and at each sampling moment, if the absolute value of the variation in the output signal is less than a comparison value, the servo control is kept active. A circuit for processing and a pressure-measuring device including a circuit of this kind is also described.

15 Claims, 6 Drawing Sheets

METHOD AND CIRCUIT FOR PROCESSING A SIGNAL SUPPLIED BY A PIEZOELECTRIC SENSOR, AND PRESSURE-MEASURING DEVICE FOR PISTON ENGINE

The invention relates to a method and a circuit for processing a signal supplied by a piezoelectric sensor indicating the pressure, called the cylinder pressure, prevailing in a cylinder chamber of a piston engine such as a heat engine, this signal being in the form of pulses (corresponding to the normal, rapidly varying phases of the cylinder pressure as a result of displacement of the piston and/or thermodynamic cycle, in particular that of combustion) separated by components of greater length, called plateaux, corresponding to values of the cylinder pressure which are at least substantially constant.

In the various kinds of piston engines, such as pumps or more particularly internal combustion engines, it is useful to be able to measure in situ (that is, while the engine is operating) the cylinder pressure prevailing in each chamber of each cylinder in order to optimise the design and manufacture of the engine and above all its operation, in real time using a regulating electronics unit. Thus, it is known in particular to measure the cylinder pressure prevailing in the combustion chamber of a cylinder of a diesel engine by means of a piezoelectric sensor integrated in a glow plug. The signal for measuring pressure as a function of time during the engine cycles is normally formed by a continuous component, corresponding to the phases during which the cylinder pressure corresponds at least substantially to atmospheric pressure (intake and exhaust phases), on which the pressure peaks (compression and combustion phases) are superposed at a frequency depending on the engine speed.

While it is particularly advantageous to use a piezoelectric sensor in this context, the problem arises of processing the signal supplied by a sensor of this kind, which on the one hand requires amplification and conversion (since a piezoelectric sensor supplies a small quantity of electrical charges generated by the crystals, which is not directly utilisable as a measurement signal), and on the other is subject to large and undesirable variations in the absolute value of the signal supplied by the sensor, due in particular to the phenomenon of pyroelectricity, since a piezoelectric crystal is additionally sensitive to temperature.

Amplification and conversion of the signal supplied by the sensor are generally carried out by a charge amplification circuit, usually comprising an operational amplifier and a parallel capacitor.

The undesirable variations in the absolute value of the signal supplied by the sensor comprise shifts in the value of the continuous component, and these shifts may be drifts in the minimum value, in the form of successive square-wave forms, or even change continuously over time, for example by an affine function or by at least one low-frequency component. Various solutions have been proposed for compensating these undesirable variations, in particular for measuring the cylinder pressure of a piston engine, in which variations in temperature are also very pronounced.

A known solution for compensating these undesirable low-frequency variations in the absolute value of the signal consists in associating a high-pass filter with the charge amplifier. In general, since the charge amplifier comprises a parallel capacitor, all that needs to be done in order to form a high-pass filter of this kind is to add a parallel resistor. However, although this solution suppresses low-frequency variations, it does not allow a constant reference value of the output signal to be ensured. Thus, this solution does not allow the shifts formed by a simple drift in the absolute value of the signal, for example as a function of the temperature caused by a pyroelectric effect, to be taken into account correctly. Some proposals have been made to improve the performance of the filter, although these have not solved the problem mentioned above.

WO 2010/057571 proposes a method of correcting the undesirable drift in the signal from a pressure sensor (due to the phenomenon of pyroelectricity) by using Kalman filters. However, on the one hand this solution needs it to be possible to detect the peaks in the signal reliably, which is not always straightforward when the engine is operating at low speed, and on the other it needs a specific, distinct circuit to be added to the charge amplifier, downstream of the latter, and to carry out a processing step to generate an extrapolation curve while the signal is measured at the peaks. This results in considerable cost and lower performance. In particular, with this compensation, which does not represent a closed-loop servo control, the dynamics of the amplifier and the resolution of the analogue/digital converter must be compatible with the maximum drifts in the signal.

According to another known solution, the value of the voltage supplied from the output of the charge amplifier is compared with a predetermined value corresponding to the reference value sought at the output, and the difference between the measured value and the reference value is used to introduce a compensation current at the input of the charge amplifier during a following cycle. This solution has the major disadvantage that compensation will be delayed from one cycle to the next, and so it is not suitable when the variations in amplitude and frequency may be abrupt and significant from one cycle to the next, as in the case of a piston engine such as an internal combustion engine.

U.S. Pat. No. 4,962,328 describes a charge amplification circuit for a piezoelectric pressure sensor in internal combustion engines, comprising a drift-compensating device formed by a sample/hold circuit which is connected to a trigger device in accordance with the period of the measured signals. The trigger device may comprise a clock generator and a counter whereof the output triggers the production of sample pulses when a predetermined value has been reached. The counter allows the rising and falling edges of the measured signals to be managed and, in cooperation with a comparator and the clock generator, the time interval in which the measured signal is below a predetermined threshold signal level to be determined. Then, once a period corresponding to half this time interval has elapsed, the sample pulses may be transmitted to the sample/hold circuit. The sample/hold circuit compensates the shift by re-introducing, at the input of the charge amplification circuit, a current formed from the output voltage of this circuit on passing through a series resistor. Moreover, a monitoring unit allows the sample pulse input to be set to a "high" value when the intervals between trigger pulses exceed a predetermined length, thereby switching the circuit to an operating mode of continuous compensation in which the output of the charge amplifier is continuously compensated. Consequently, the shift is continually compensated when the engine turns at low speed or is stopped, and the signals supplied are relevant as soon as the engine speed increases again.

The performance of this drift compensation is linked on the one hand to the appropriate choice of amplifier and the value of the series resistor having the sample/hold circuit, and on the other to the precision of detecting the centre of the plateaux between the signal peaks.

As this document explains, although two series resistor values and a means of adjusting sensitivity are provided, the compensation is performed in a swinging operation. If the value of the series resistor is too high, the compensation current will not be strong enough to perform effective compensation; if, on the other hand, the value of the series resistor is too weak, compensation is too dynamic and continual swinging may result. In this regard, it should be noted that the servo control proposed by this document performs poorly, in a manner limited by its design. In fact the sampling frequency for measurement is necessarily performed at the engine frequency. However, a closed-loop servo control requires sampling for measurement at a much higher frequency than that of the phenomenon to be controlled. Thus, the servo control proposed in this document can only be used to compensate very slow variations (typically, variations of more than 100 seconds, such as those due to fault currents).

Detection of the centres of the plateaux between the peaks is reliable when it is carried out using an external detector associated with the engine crankshaft, but this solution requires the engine to be appropriately equipped, which is a major disadvantage and does not allow the fundamental problem mentioned above to be alleviated.

The embodiment in which detection is supposed to be carried out through a comparison between the signal voltage value and a predetermined threshold value is not functional, in that there is no absolute threshold value for allowing detection of the peaks, which vary in their amplitude and frequency over broad ranges for the same engine, and in different ranges from one engine to another (for example a diesel engine and a petrol engine). If the threshold value is too low, an undesirable variation caused by a drift during a plateau between two peaks may erroneously be considered a peak; and if the threshold value is too high, peaks having an amplitude below this threshold value will not be detected. Moreover, here too the solution described in this document does not allow shifts in absolute value to be taken into account, such as the more rapid and possibly relatively high-amplitude variations in the continuous component of the signal, such as those due for example to the phenomenon of pyroelectricity. Thus, in this document an abrupt and significant variation due to pyroelectricity (for example an abrupt increase in temperature when the engine is started up) will be considered a normal pulse which is not therefore compensated.

As a result, up until now no satisfactory solution has been proposed to carry out a reliable compensation of the various shifts from the absolute reference value of the signal supplied by a piezoelectric pressure sensor which simultaneously suppresses the low-frequency signal variations, corrects the square-wave or progressive drifts of the reference value, does not need the addition of electronic circuits to complement the charge amplifier, is compatible with the operation of a piston engine such as an internal combustion engine, in particular where there are abrupt and significant variations in amplitude and frequency from one cycle to the next, such as those due to pyroelectricity, and is simple and inexpensive to implement.

The object of the invention is to solve this problem.

The object of the invention is therefore to propose a method and a circuit for processing a signal supplied by a piezoelectric sensor which enables compensation having the properties mentioned above to be carried out.

More particularly, the object thereof is to propose a method and a circuit for processing which do not need any complex configuring adjustments dependent on the engine on which the piezoelectric sensor is mounted, while having the capacity to deal with the variety occurring in operation (shape of the peaks indicating the pressure pulses, frequencies, linearity of components, and so on).

Another object is to propose a solution that is compatible with complete integration of the electronics for processing the signal within a single mechanical assembly comprising the piezoelectric sensor, for example within a glow plug for a diesel engine.

To this aim, the invention relates to a method of processing a signal supplied by a piezoelectric sensor, said signal indicating a pressure value, called the cylinder pressure, prevailing in a cylinder chamber of a piston engine such as a heat engine, said signal having a value in the form of pulses separated by components of greater length, called plateaux, corresponding to values of the cylinder pressure which are at least substantially constant, in which method:
  undesirable variations in the value corresponding to said plateaux of said signal supplied by said sensor are compensated by a compensation circuit comprising a closed-loop servo control which, when it is active, is capable of supplying an output signal with a value set to a predetermined constant value Sr, called the reference value Sr, independently of any undesirable variations in the value corresponding to said plateaux of said signal supplied by said sensor,
  said signal supplied by said sensor is treated by an operational amplifier, said operational amplifier receiving said signal as an input and supplying said output signal as an output,
  said closed-loop servo control supplying a compensation current Icon as an input of said operational amplifier in parallel with said signal supplied by said sensor,
wherein:
  the value of said output signal is measured and stored for successive sampling moments at a sampling frequency greater than the maximum frequency of said pulses,
  at each sampling moment, a value indicating a variation $\Delta S$ in the output signal with respect to a past sampling moment is calculated,
  at each sampling moment, if the absolute value of said variation $\Delta S$ is less than a predetermined comparison value V, said servo control is kept active to set the output signal to said reference value Sr, the value of said output signal being a value corresponding to a plateau.

Thus, in contrast to the prior art, in which the peaks of the signal are detected by comparison with a threshold voltage value, in a method of processing according to the invention the plateaux of the signal are detected by a calculation and comparative analysis of the variation in the output signal, that is from a mathematical point of view on the basis of its derivative with respect to time. The result is that detection of the undesirable shifts of all kinds that may be found in the absolute value of the signal supplied by the sensor is much more reliable, and compensation by the servo control, which is kept active during all phases of the signal in which it can correct these undesirable shifts, is also more reliable. Moreover, detection of the plateaux is now independent of the frequency and amplitude of the peaks. In particular, undesirable variations due to pyroelectrical phenomena are compensated once said comparison value is selected such that it is greater than the maximum absolute value of the slope of variations due to these phenomena, while of course remaining less than the minimum values of the absolute value of the slope of variations due to normal pulses of the signal.

Furthermore, in a method according to the invention, the frequency of sampling may be very much greater than the frequency of pulses (which corresponds to the frequency of operation of the engine, that is its operating speed). Advantageously and according to the invention, the frequency of sampling is greater than 10 times the maximum frequency corresponding to the maximum speed of the engine, for example in the order of 100 times this maximum frequency or even more. Consequently, the servo control is fully effective between two pulses, even at maximum speed.

The invention further relates to a processing circuit for implementing the method of processing according to the invention. Thus, the invention also relates to a circuit for processing a signal supplied by a piezoelectric sensor, said signal indicating a pressure value, called the cylinder pressure, prevailing in a cylinder chamber of a piston engine such as a heat engine, said signal having a value in the form of pulses separated by components of greater length, called plateaux, corresponding to values of the cylinder pressure which are at least substantially constant, this circuit comprising:

a compensation circuit comprising a closed-loop servo control which, when it is active, is capable of supplying an output signal with a value set to a predetermined constant value, called the reference value Sr, independently of any undesirable variations in the value corresponding to said plateaux of said signal supplied by said sensor, an operational amplifier receiving said signal supplied by said sensor as an input and supplying said output signal as an output, said closed-loop servo control supplying a compensation current Icon as an input of said operational amplifier in parallel with said signal supplied by said sensor, wherein the compensation circuit comprises:

a detection circuit suitable for measuring and storing the value $S(t)$ of the output signal for successive sampling moments t at a sampling frequency greater than the maximum frequency of said pulses, and means for processing data that are adapted to calculate, at each sampling moment, a value indicating a variation $\Delta S$ in the output signal with respect to a past sampling moment, and in that the compensation circuit is adapted so that, at each sampling moment, if the absolute value of said variation $\Delta S$ is less than a predetermined comparison value V, said closed-loop servo control is activated to set the output signal to said reference value Sr, the value of said output signal being a value corresponding to a plateau.

Moreover, the effectiveness of processing the signal in a method according to the invention may be improved considerably. To do this, advantageously and according to the invention said variation $\Delta S$ is calculated between two sampling moments which are separated by a period of time $\alpha T$ which is an increasing function of the number of past sampling moments for which the absolute value of said variation has remained below said predetermined comparison value V. Similarly, in a circuit for processing according to the invention, said detection circuit is advantageously adapted to be able to calculate said variation between two sampling moments which are separated by a period of time $\alpha T$ which is an increasing function of the number of past sampling moments for which the absolute value of said variation has remained below said predetermined comparison value.

In practice, it has been found that the addition of an increasing function of this kind, in particular a homothetic function, of the period over which the variation in the output signal is calculated considerably increases the sensitivity of the compensation obtained without having any adverse effect on its dynamic performance, in particular without introducing unwanted secondary effects such as undesirable oscillations or the omission of some peaks, whatever the operating speed of the engine (that is, both at very low speed and at very high speed).

In particular, advantageously and according to the invention, the period over which said variation is calculated is for example a multiple of a fraction of the total length of the plateau, from the first sampling moment for which this plateau has been detected as present. This multiple may be equal to the number of iterations—that is, samples taken—carried out from the first sampling moment for which this plateau has been detected as present.

Moreover, advantageously and according to the invention, said period is delimited between a predetermined minimum value $\alpha T min$ not equal to zero—in particular corresponding to a fraction of the total length of a plateau at maximum speed (in the red zone) of the engine—and a predetermined maximum value $\alpha T max$ not equal to zero—in particular corresponding to a fraction of the total length of a plateau at minimum speed (idling speed) of the engine.

The invention may be applied not only to a charge amplifier for processing the signal supplied by the sensor but also to other types of processing of this signal, for example processing the signal in low impedance voltage mode (LIVM). However, in a preferred embodiment, a method according to the invention is also characterised in that the signal supplied by the sensor is processed by a charge amplifier receiving this signal as an input and supplying said output signal as an output, and in that said closed-loop servo control supplies a compensation current Icorr as an input of said charge amplifier in parallel with said signal supplied by said sensor. Similarly, advantageously and according to the invention, said processing circuit comprises a charge amplifier receiving as an input the signal supplied by the sensor, and supplying said output signal as an output, said compensation circuit supplying, when said closed-loop servo control is active, a compensation current as an input to the charge amplifier in parallel with said signal supplied by said sensor, said detection circuit receiving said output signal supplied by said charge amplifier.

This compensation current is advantageously supplied by applying a voltage value supplied by the compensation circuit to a series resistor of a branch connected in parallel with the input of the charge amplifier receiving the signal from the sensor. It should be noted, however, that even when the charge amplifier takes the form of an operational amplifier and a parallel capacitor, this capacitor and this resistor do not act as a simple high-pass filter—as in the prior art—because of the presence of the compensation circuit, which performs a specific processing step. Thus, in particular, the value C of the capacitor and R of the resistor do not need to be adapted as a function of a cutoff frequency and may be minimised on the one hand for the operation of charge amplification (with the parallel capacitor determining the gain) and on the other as a function of the dynamics of the servo control. Thus, whereas in the prior art a value of RC is typically in the order of a second, the invention allows the use of a value for RC which is typically less than 50 ms. Aside from reduced costs, this results in much smaller component elements which are easier to integrate with the piezoelectric sensor, in particular in a glow plug.

Moreover, advantageously and according to the invention, if the absolute value of said variation $\Delta S$ is greater than the predetermined comparison value V, said servo control is inactive and a constant value of compensation current is applied as the input of said operational amplifier, independently of the values of the output signal. Similarly and advantageously, in a circuit for processing according to the invention, the compensation circuit is adapted to inactivate said servo control and to apply a constant value of compensation current, independent of the values of the output signal, if the absolute value of said variation is greater than the predetermined comparison value.

In fact, a value of said variation greater than the comparison value corresponds to a peak in pressure during which the output signal indicates the pressure measured, and thus normally varies by a significant amount. In an operational phase of the engine of this kind, which is generally very brief, all that needs to be done is to keep the compensation constant while ignoring any shifts in the absolute value of the signal supplied by the sensor which may occur during this phase.

This constant value may be equal to the last value used (during the previous plateau) or may be calculated from this last value. Preferably, said constant value corresponds to a mean value calculated for a plurality of sampling moments during which said servo control is active. This mean value may be a mobile mean calculated from some or all of the values calculated since the start of the plateau and/or the values in a buffer memory, among other things. It may be an arithmetic mean, an exponential mean or a weighted mean, among others. Said constant value corresponds to a mean value of this kind but is not necessarily equal to this mean value.

Moreover, advantageously, in a method and a circuit for processing according to the invention, the functions of the compensation circuit are performed in wholly digital form, such that the compensation circuit may for example take the form of an integrated circuit (for example ASIC, FPGA or microprocessor) having digital components. Thus, advantageously and according to the invention, said detection circuit comprises an analogue/digital converter which receives the output signal and is adapted to measure, store and process said values of the output signal in digital form. Moreover, advantageously a processing circuit according to the invention is also characterised in that said compensation circuit is adapted to process digital data and to calculate a digital compensation voltage value Corr, and in that said compensation circuit comprises a digital/analogue converter, which receives said digital compensation voltage value Corr and supplies an corresponding analogue value Ucorr to a series resistor connected in parallel with an output of said sensor.

The invention also further relates to a processing method implemented in a processing circuit according to the invention.

The invention also relates, more particularly, to a device for measuring a pressure value, called the cylinder pressure, prevailing in a cylinder chamber of a piston engine such as a heat engine, comprising a piezoelectric sensor and a circuit for processing a signal supplied by said piezoelectric sensor, wherein said processing circuit is a circuit according to the invention.

In a pressure-measuring device according to the invention, said processing circuit and said piezoelectric sensor may be integrated in a single mechanical assembly mounted on an engine, in particular in a single glow plug.

The invention further relates to a method of processing, a circuit for processing and a pressure-measuring device which are characterised in combination by some or all of the features mentioned above or below.

Other objects, features and advantages of the invention will become apparent from the description below, which refers to the attached figures, which represent by way of non-restrictive example one of its preferred embodiments, and in which.

Figure 1:
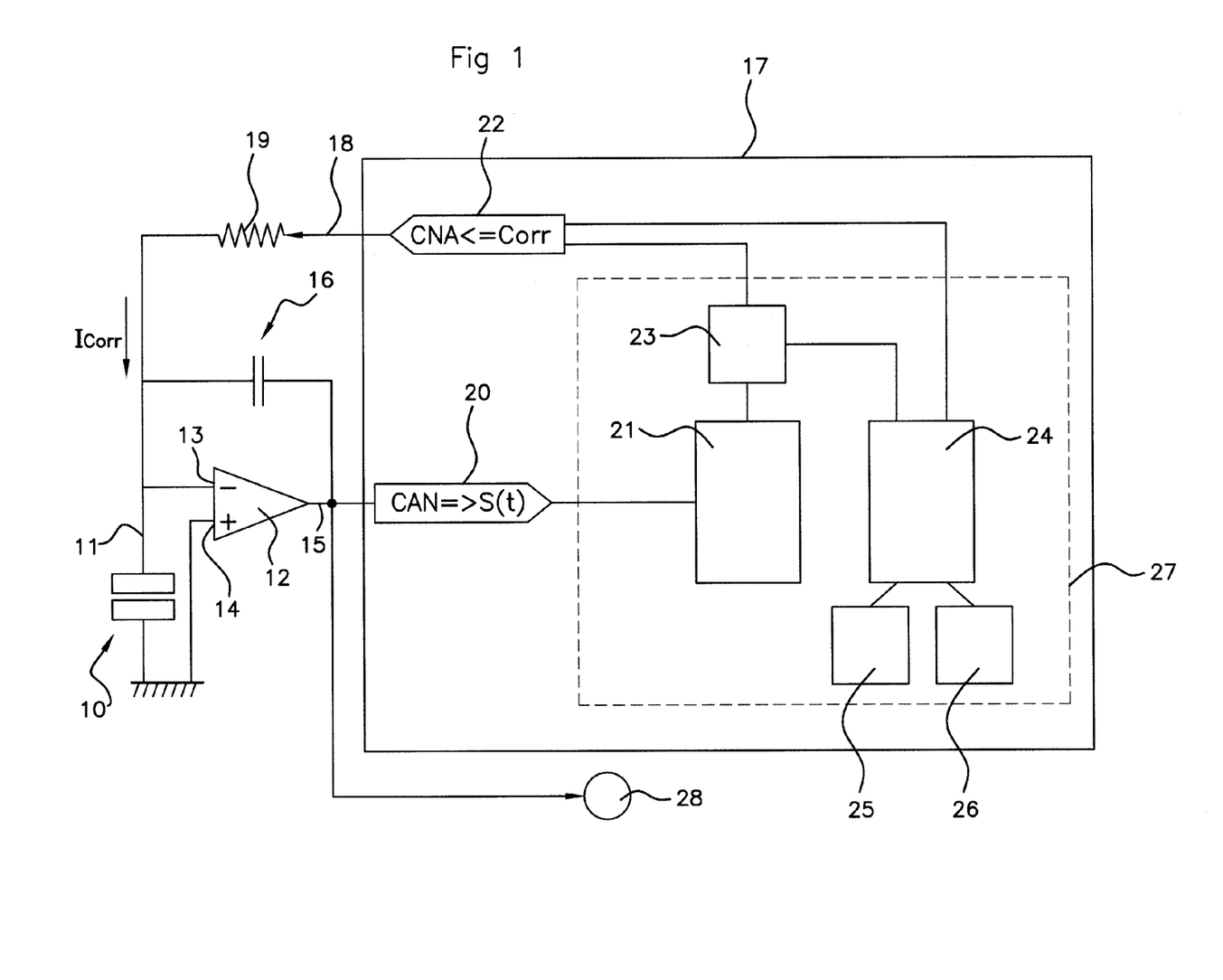
FIG. 1 is an overall diagram of a device for measuring pressure according to the invention, comprising a processing circuit according to a first embodiment of the invention.

The device for measuring pressure according to the invention which is shown in FIG. 1 comprises a piezoelectric sensor 10 which supplies, at a terminal 11, a signal (in the form of electrical charges) processed by a processing circuit according to the invention which comprises a charge amplifier comprising, in the first embodiment shown in FIG. 1, a high-gain inverting operational amplifier 12 and a capacitive feedback element 16 of capacitance C. The terminal 11 of the sensor 10 is connected to the inverting input 13 of the operational amplifier 12, whereof the non-inverting input 14 is connected to earth and whereof the output 15 supplies a voltage proportional to the charge produced by the sensor 10. The capacitive branch 16 is connected in parallel between the output 15 and the inverting input 13 of the operational amplifier 12 receiving the signal from the sensor 10.

The piezoelectric sensor 10 allows the pressure prevailing in a cylinder chamber of a piston engine such as a heat engine to be measured. It is for example integrated in a glow plug of a diesel engine. It supplies a signal indicating this cylinder pressure, this signal being in the form of pulses which are relatively brief and correspond to the normal, rapidly varying phases of the cylinder pressure as a result of displacement of the piston and/or combustion, these pulses being separated by plateaux of greater length corresponding to values of the cylinder pressure which are at least substantially constant.

It should be noted that, depending on the applications and constraints, the operational amplifier 12 may take various embodiments, and in particular may be constructed with more or less complex architectures.

The processing circuit according to the invention also comprises a compensation circuit 17 forming a closed-loop servo control. This compensation circuit 17 receives the (voltage) output signal from the output 15 of the charge amplifier. The compensation circuit 17 supplies a corrective voltage signal Ucorr to an output 18 which is connected to a terminal of a series resistor 19 whereof the other terminal is connected to the input 13 of the charge amplifier receiving the signal supplied by the sensor 10. The resistor 19, of value R, transforms the corrective voltage signal Ucorr into a corrective intensity signal Icorr which is added to the signal supplied by the sensor 10 and allows its undesirable variations in absolute value to be compensated.

The voltage signal supplied by the charge amplifier at the output 15 is thus compensated and delivered at an output 28 of the processing circuit, allowing it to be utilised in connection with other external systems, for example electronics for managing operation of the engine.

The compensation circuit 17 comprises an analogue/digital converter 20 which supplies a digital signal S corresponding to the analogue voltage from the output 15 of the charge amplifier.

Figure 2:
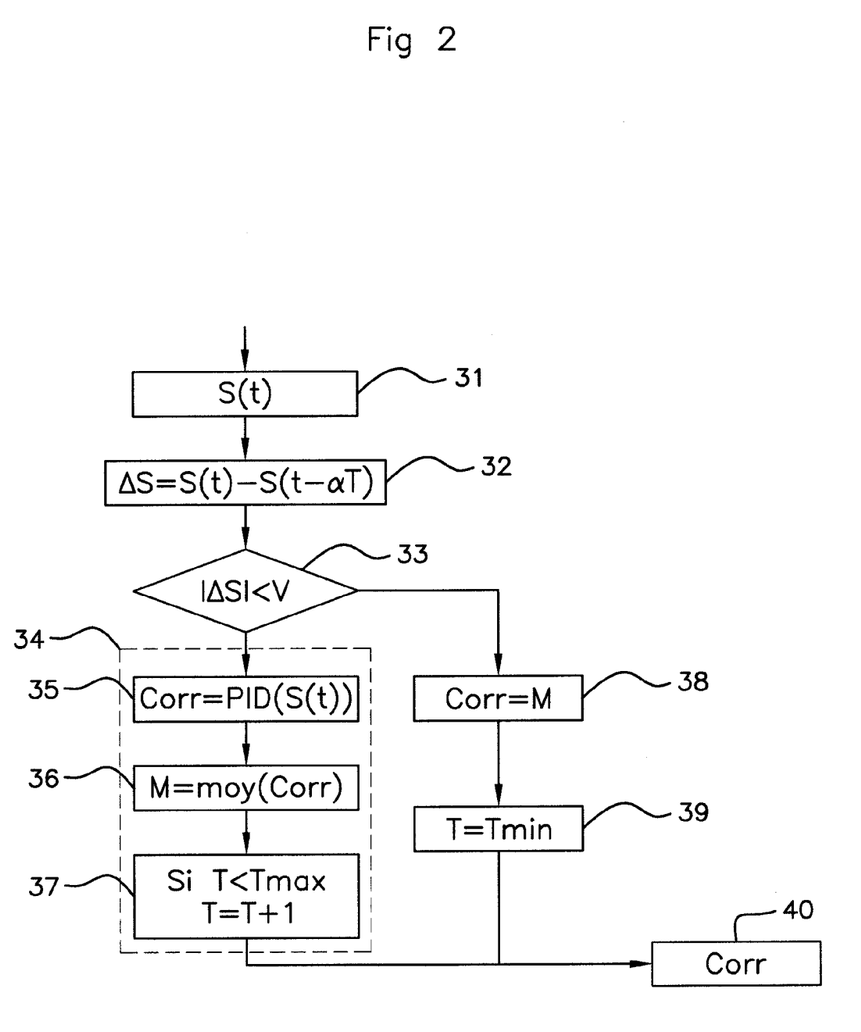
FIG. 2 is a flow chart of an embodiment of a processing method according to the invention.

This digital signal S is fed as an input to an integrated circuit 27 (which may be in the form of an ASIC, an FGPA or a microprocessor, among other things), comprising a circular buffer memory 21 which successively stores the sampled measurements S(t) of the signal S in dependence on a sampling clock frequency supplied by a clock generator 23 of the circuit 27. The integrated circuit 27 also comprises at least one microprocessor 24, at least one read-only memory 25 and at least one random access memory 26 which are associated with this microprocessor. The microprocessor 24 performs the method of processing according to the invention on each sampled value of the signal S, as shown in FIG. 2. The microprocessor 24 supplies at the output of the integrated circuit 27 a corrective digital signal Corr supplied to a digital/analogue converter 22 which supplies an analogue corrective voltage signal Ucorr to the output 18 of the compensation circuit 17.

An example of the method of processing the signal S which is performed by the compensation circuit 17 on each iteration, that is each time the output signal is sampled, is shown in FIG. 2.

During the first step 31, the current value S(t) of the signal S is stored at an edge of a sample clock, at the location of the circular buffer 21 activated by this clock edge.

During the second step 32, the variation $\Delta S$ in the output signal S is calculated from the current value S(t) at the moment t of the clock edge and one of the previous values of the signal S, called $S(t-\alpha T)$, which is stored in the circular buffer 21 for a clock edge closest to the value $t-\alpha T$, where T is a natural integer and $\alpha$ is a rational number between 0 and 1. For example, $\alpha$ is selected to be between 0.05 and 0.5, in particular in the order of 0.2. $\alpha T$ represents the period over which the variation $\Delta S$ is calculated, which is thus a fraction of a complete period represented by T, whereof the value is between a minimum value not equal to zero, Tmin, and a maximum value Tmax. These values are selected as a function of the respective maximum and minimum speeds of the engine. Thus, Tmin is less than the length of the plateaux for the maximum engine speed, and Tmax is greater than the length of the plateaux for the minimum engine speed.

During the third step 33, the absolute value $|\Delta S|$ of this variation is compared with a predetermined comparison value V which is stored in the memory 25. In practice, this comparison value may be adjusted from the inherent noise in the signal between the plateaux by setting it at a greater value than the maximum value of the derivative of this inherent noise.

If the absolute value $|\Delta S|$ of the variation in the output signal is less than the comparison value V, this means that the signal supplied by the sensor 10 corresponds to a plateau of the cylinder pressure, and a servo control 34 is activated.

In a first step 35, this servo control 34 consists in calculating a value for the corrective signal Corr which allows the output signal S to be set to the predetermined reference value Sr, independently of any undesirable variations in the absolute value of the signal supplied by the sensor 10. This reference value Sr forms a setpoint value of the servo control 34 and may be selected and stored in the memory 25, depending on the constraints on the electronic circuits which are located downstream of the processing circuit according to the invention and receive the output signal.

This step of calculating the value of the corrective signal Corr may take various embodiments. Preferably, advantageously and according to the invention, this calculation is performed by a PID (proportional integral derivative) controller which receives the current value S(t) as an input, calculates the error with respect to the reference value Sr and makes a PID adjustment of this error. It should be noted that the corrective signal Corr is a digital voltage signal.

During the following step 36 of the servo control 34, the current value of the corrective signal Corr is stored and a mean M of this corrective signal Corr is calculated using the current value and different previously stored values of this corrective signal Corr.

This mean is preferably an algebraic average calculated from a number of previous samples. For example, on each iteration, this mean is calculated from the $\beta T$ previous samples, where $\beta$ is a rational number between 0 and 1, for example in the order of 0.5, selected to filter out the slight variations in the signal over the plateaux.

Figure 7:
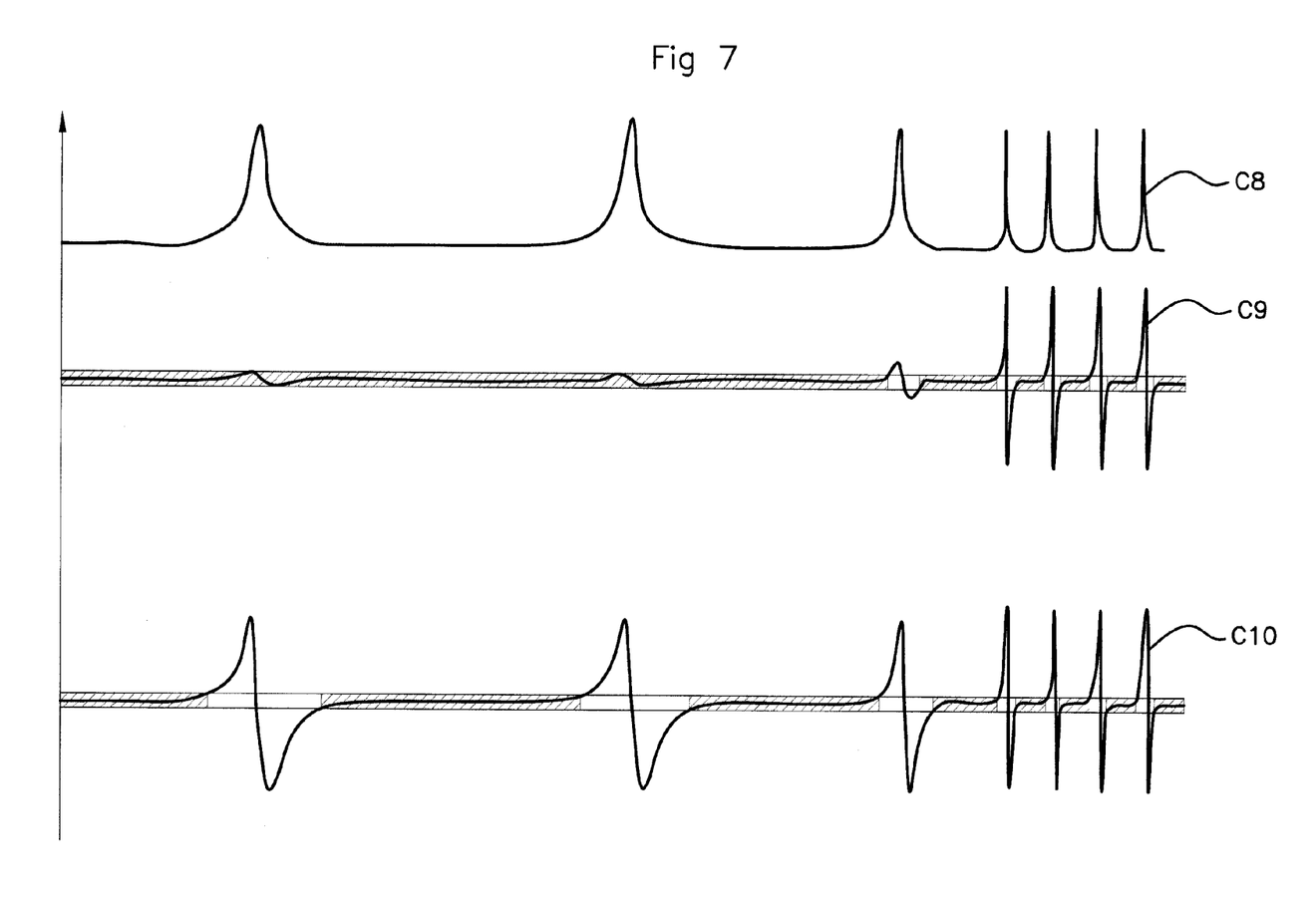
FIG. 7 is a graph over time illustrating respectively (from the top down) another example of an output signal compensated by processing according to the invention during an increase in the engine speed (curve C8), the derivative with respect to time of this signal (curve C9), and the variation in the signal as calculated in a method according to the invention (curve C10)

During the following step 37 of the servo control 34, T is incremented by one unit and the length $\alpha T$ used to calculate the variation $\Delta S$ is increased by $\alpha$, unless the current length is equal to a maximum predetermined length $\alpha$Tmax. Tmax corresponds for example to the greatest possible length of the plateaux, that is—in particular if the engine is a motor—to the length of the plateaux when the engine is idling. To achieve this, if this value Tmax is not reached, the value of T is increased by one unit on each iteration for which the servo control was activated, that is after each calculation of a value of the corrective signal Corr. Thus, the length is an increasing function of the number of past sampling moments for which the absolute value $|\Delta S|$ of the variation remained below said predetermined comparison value, that is for which the signal supplied for the sensor corresponds to a single plateau. In other words, the calculation length of variation in the output signal increases as the signal supplied by the sensor 10 remains on the same pressure plateau. Consequently, the sensitivity of detecting the plateaux is independent of the speed of the engine, as shown in FIG. 7.

In this figure, the curve C8 shows an output signal corresponding to a phase of increasing speed of the engine. The curve C9 represents the derivative with respect to time of the curve C8. The hatched portions represent values of this derivative for which the absolute value of the derivative is less than a predetermined comparison value, and which would correspond to the plateau phases if this derivative were used as a variation in the output signal in the servo control. As can be seen, for low engine speeds, the pulses would not be detected, since the sensitivity of detection is insufficient. By contrast, the curve C10 represents the value $\Delta S$ calculated according to the invention for an increasing length calculation. As can be seen, this progressive increase in the range of calculation allows the plateaux to be distinguished from the pulses, even at low speed.

It should be noted that the number $\beta T$ of past samples used to calculate the mean M also increases with each iteration by the incrementing of T as long as the signal supplied by the sensor 10 remains on the same pressure plateau.

If the comparison step 33 determines that the absolute value |ΔS| of the variation in the output signal is not less than the comparison value V, this means that the signal supplied by the sensor 10 corresponds to a peak in the cylinder pressure, and the servo control 34 is made inactive. In this case, during the step 38 the corrective signal Corr is set to the last recorded value of the mean M calculated the last time the step 36 of the servo control 34 was performed.

During the following step 39, the value of T is reset to an initial minimum value Tmin not equal to zero. Tmin corresponds for example to the shortest possible length of the plateaux, that is—in particular if the engine is a motor—to the length of the plateaux at the maximum speed of operation of the engine. During a pressure peak and immediately after a pressure peak of this kind, the value of T is thus set to Tmin, with the result that the minimum length taken into account in calculating the variation ΔS at the start of a plateau phase is equal to αTmin. This length is then progressively increased by the value α on each iteration.

Whatever the case, during the final step 40, for each sampling moment t, that is after each clock edge, the method of processing according to the invention supplies a value Corr for the corrective signal.

Figure 3:
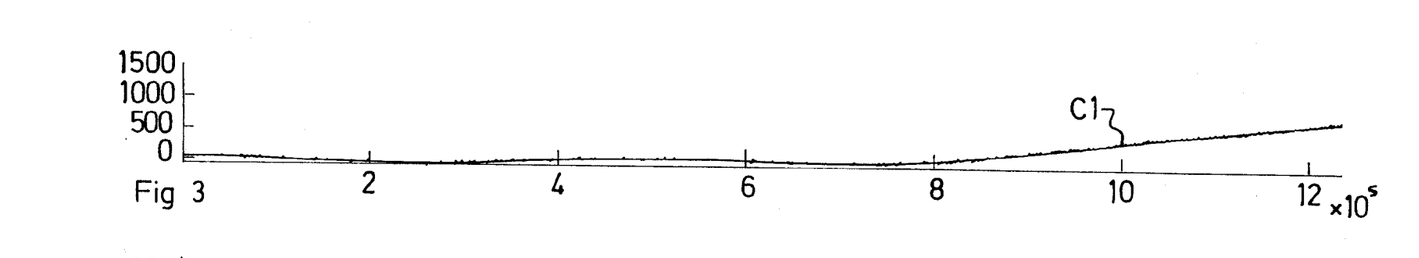
FIG. 3 is a graph over time illustrating an example of variations in the continuous component of the signal which are due to pyroelectricity, represented as variations in pressure (curve C1)
Figure 4:
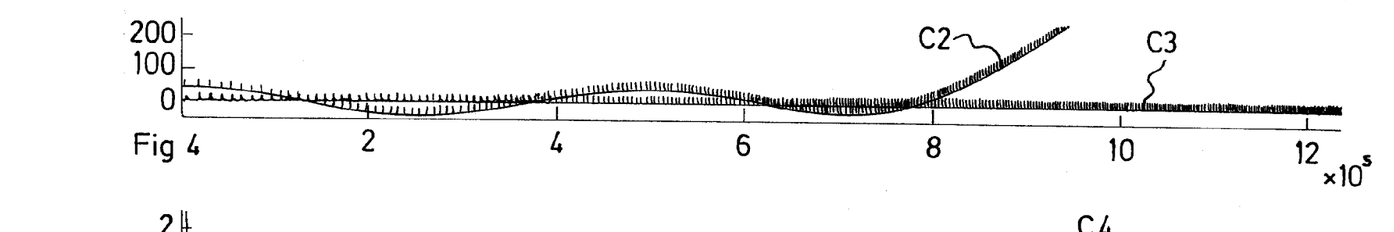
FIG. 4 is a graph over time corresponding to FIG. 3 and illustrating an example of a signal supplied by a piezoelectric sensor (curve C2) and the corresponding output signal, compensated by a method and a circuit for processing according to the invention, as obtained by computer simulation (curve C3)
Figure 5:
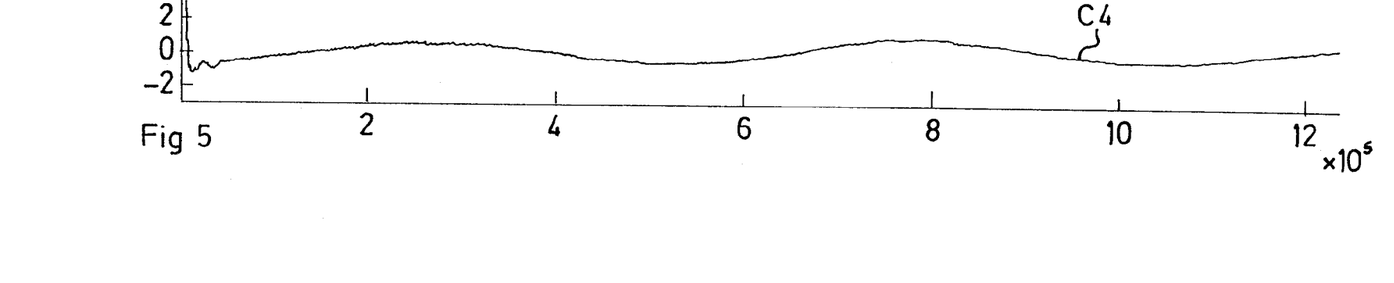
FIG. 5 is a graph over time corresponding to FIGS. 3 and 4 and illustrating the residual error in the signal after compensation (curve C4) by a method and a circuit for processing according to the invention.

FIGS. 3, 4 and 5 give examples of results which may be obtained with a method and a circuit for processing according to the invention, in particularly unfavourable conditions, that is for a diesel engine which is initially idling (500 revolutions per minute) with engine braking (pulses corresponding to a maximum pressure in the order of 20 bar (20.10$^5$ Pa). In these conditions, the pulses are in fact particularly difficult to distinguish.

In FIGS. 3, 4 and 5, the values of the y axes relate to the pressure in bar. The curve C1 in FIG. 3 represents an example of the variations in the continuous component of the signal supplied at the output of the piezoelectric sensor 10; these variations may be perceived in particular in the pyroelectric effect resulting from the increase in engine speed. The curve C2 in FIG. 4 represents the signal supplied by the piezoelectric sensor 10. The curve C3 represents the fully compensated output signal supplied at the output 28. As can be seen from the curve C4 in FIG. 5, the residual error is extremely small and is not significant.

Figure 6:
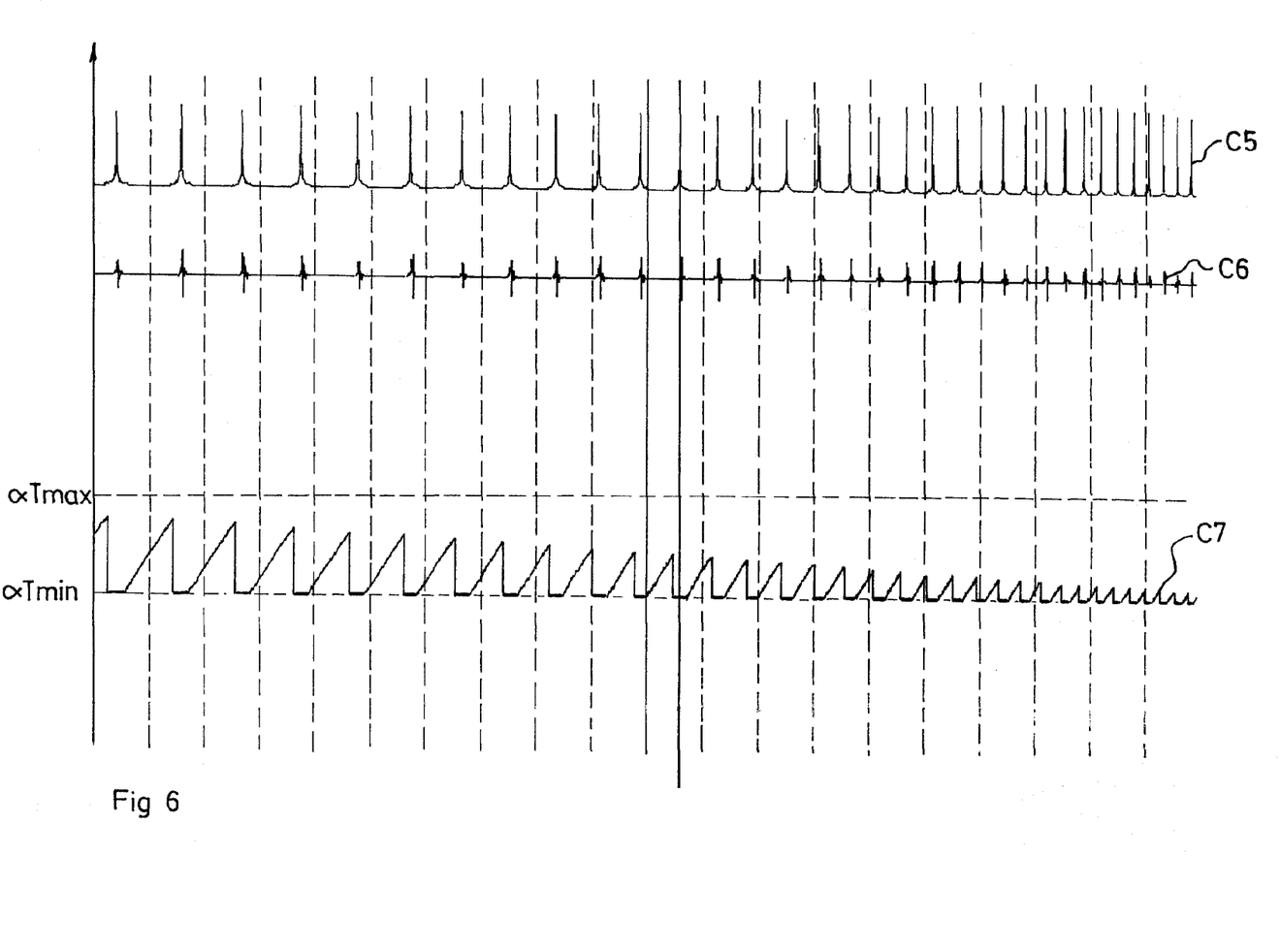
FIG. 6 is a graph over time on a larger scale, illustrating respectively (from the top down) an example of an output signal compensated by processing according to the invention (curve C5), the variation $\Delta S$ in this signal calculated according to the invention (curve C6), and the period $\alpha T$ over which the variation $\Delta S$ in the output signal is measured and compared with a comparison value (curve C7)

In FIG. 6, the curve C5 illustrates another example, on a different scale, of the profile of the output signal compensated according to the invention, and the curve C6 represents the variation ΔS of this signal, calculated according to the invention. The curve C7 illustrates the change in the calculation length αT as considered for calculation of the variation ΔS, with each successive plateau. At the start of each plateau, αT=αTmin. The length increases on each iteration and each sampling as long as no peak (pulse) is detected. As the engine speed increases (from left to right in the figures), the total length of time considered in each plateau falls.

Figure 8:
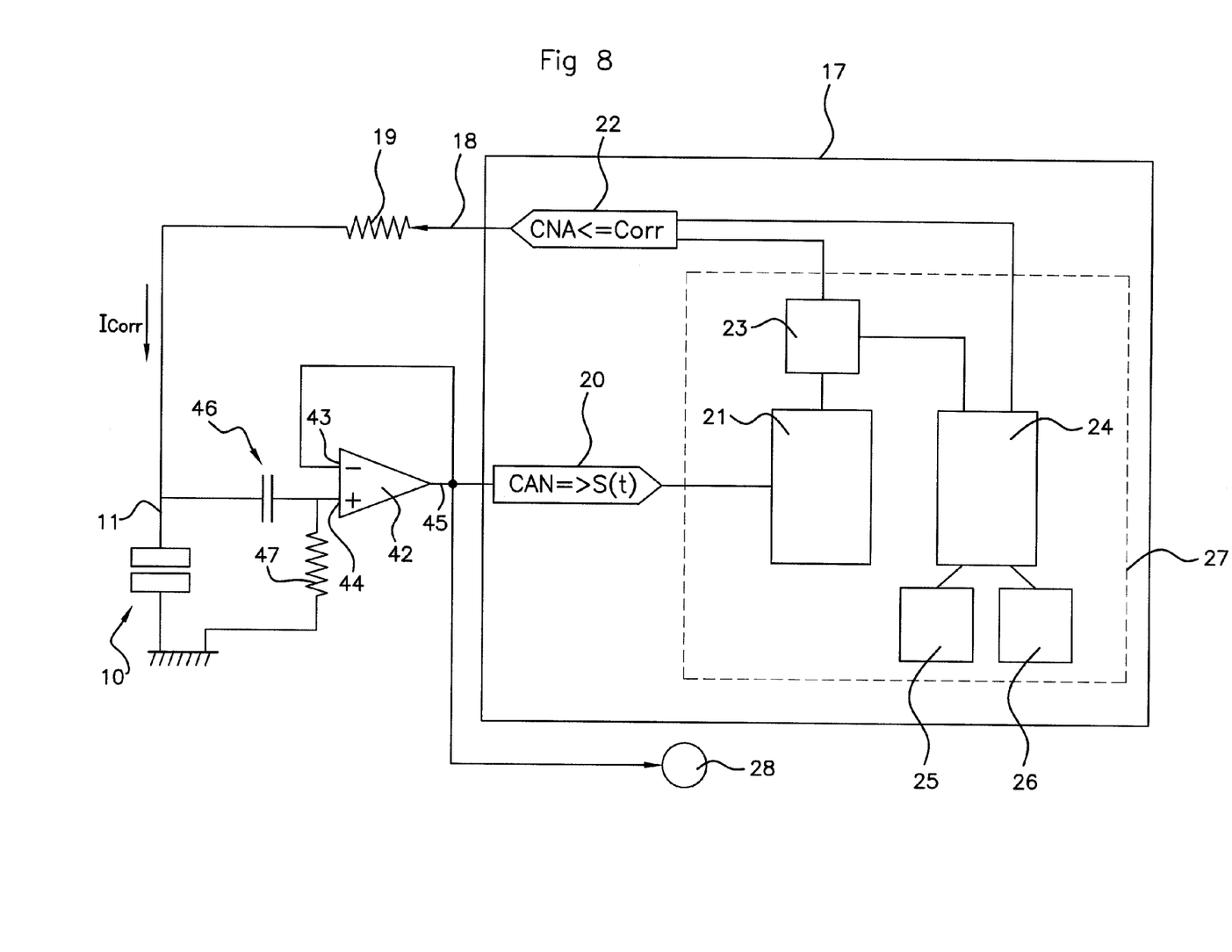
FIG. 8 is an overall diagram of a device for measuring pressure according to the invention, comprising a processing circuit according to a second embodiment of the invention.

FIG. 8 shows another embodiment of a processing circuit according to the invention, which differs from the first embodiment in that the charge amplifier is replaced by a low impedance voltage mode (LIVM) amplifier circuit. The circuit thus comprises an operational amplifier 42 mounted as a follower, with its output 45 connected to its inverting input 43 and the output 11 of the piezoelectric sensor 10 connected to the non-inverting input 44 of the operational amplifier 42 by way of a series capacitor 46 and a parallel resistor 47. As can be seen, the compensation circuit 17 remains absolutely unchanged, with the analogue signal Ucorr for correcting the voltage supplied at the output of the compensation circuit 17 being received at one terminal of the resistor 19, whereof the other terminal supplies the analogue corrective signal Icorr supplied in parallel with the output 11 of the piezoelectric sensor, upstream of the series capacitor 46.

A processing circuit according to the invention may be integrated, like the piezoelectric sensor, within a single mechanical assembly, in particular within a glow plug for a diesel engine.

The invention may be subject to a number of variants on the embodiments shown in the figures and described above.

The invention claimed is:

1. A method of processing a signal supplied by a piezoelectric sensor, said signal indicating a pressure value, called the cylinder pressure, prevailing in a cylinder chamber of a piston engine such as a heat engine, said signal having a value in the form of pulses separated by components of greater length, called plateaux, corresponding to values of the cylinder pressure which are at least substantially constant, in which method:

undesirable variations in the value corresponding to said plateaux of said signal supplied by said sensor are compensated by a compensation circuit comprising a closed-loop servo control which, when it is active, is capable of supplying an output signal with a value set to a predetermined constant value Sr, called the reference value Sr, independently of any undesirable variations in the value corresponding to said plateaux of said signal supplied by said sensor, said signal supplied by said sensor is treated by an operational amplifier, said operational amplifier receiving said signal as an input and supplying said output signal as an output, said closed-loop servo control supplying a compensation current Icorr as an input of said operational amplifier in parallel with said signal supplied by said sensor, wherein:

the value of said output signal is measured and stored for successive sampling moments at a sampling frequency greater than the maximum frequency of said pulses, at each sampling moment, a value indicating a variation ΔS in the output signal with respect to a past sampling moment is calculated, at each sampling moment, if the absolute value of said variation ΔS is less than a predetermined comparison value V, said servo control is kept active to set the output signal to said reference value Sr, the value of said output signal being a value corresponding to a plateau.

2. A method according to claim 1, wherein said variation ΔS is calculated between two sampling moments which are separated by a period of time αT which is an increasing function of the number of past sampling moments for which the absolute value of said variation has remained below said predetermined comparison value V.

3. A method according to claim 2, wherein said period αT is delimited between a predetermined minimum value αTmin not equal to zero and a predetermined maximum value αTmax not equal to zero.

4. A method according to claim 1, wherein said signal supplied by said sensor is processed by a charge amplifier receiving this signal as an input and supplying said output signal as an output, and in that said closed-loop servo control supplies a compensation current Icorr as an input of said charge amplifier in parallel with said signal supplied by said sensor.

5. A method according to claim 1, wherein if said absolute value of said variation ΔS is greater than said predetermined comparison value V, said closed-loop servo control is inactive and a constant value of said compensation current is applied as an input of said operational amplifier, independently of the values of said output signal.

6. A method according to claim 5, wherein said constant value corresponds to a mean value calculated for a plurality of sampling moments during which said closed-loop servo control is active.

7. A circuit for processing a signal supplied by a piezoelectric sensor, said signal indicating a pressure value, called the cylinder pressure, prevailing in a cylinder chamber of a piston engine such as a heat engine, said signal having a value in the form of pulses separated by components of greater length, called plateaux, corresponding to values of the cylinder pressure which are at least substantially constant, this circuit comprising:
- a compensation circuit comprising a closed-loop servo control which, when it is active, is capable of supplying an output signal with a value set to a predetermined constant value, called the reference value Sr, independently of any undesirable variations in the value corresponding to said plateaux of said signal supplied by said sensor,
- an operational amplifier receiving said signal supplied by said sensor as an input and supplying said output signal as an output,
- said closed-loop servo control supplying a compensation current Icorr as an input of said operational amplifier in parallel with said signal supplied by said sensor, wherein the compensation circuit comprises:
- a detection circuit suitable for measuring and storing the value S(t) of the output signal for successive sampling moments t at a sampling frequency greater than the maximum frequency of said pulses,
- and means for processing data that are adapted to calculate, at each sampling moment, a value indicating a variation ΔS in the output signal with respect to a past sampling moment, and in that the compensation circuit is adapted so that, at each sampling moment, if the absolute value of said variation ΔS is less than a predetermined comparison value V, said closed-loop servo control is activated to set the output signal to said reference value Sr, the value of said output signal being a value corresponding to a plateau.

8. A circuit according to claim 7, wherein said detection circuit is adapted to be able to calculate said variation between two sampling moments which are separated by a period of time αT which is an increasing function of a number of past sampling moments for which said absolute value of said variation has remained below said predetermined comparison value.

9. A circuit according to claim 8, wherein said period αT is delimited between a predetermined minimum value αTmin not equal to zero and a predetermined maximum value αTmax not equal to zero.

10. A circuit according to claim 7, wherein it comprises a charge amplifier receiving as an input said signal supplied by said sensor and supplying said output signal as an output, said compensation circuit supplying, when said closed-loop servo control is active, a compensation current Icorr as an input to said charge amplifier in parallel with said signal supplied by said sensor, said detection circuit receiving said output signal supplied by said charge amplifier.

11. A circuit according to claim 10, wherein said detection circuit comprises an analogue/digital converter which receives said output signal and is adapted to measure, store and process said values of said output signal in digital form, and said compensation circuit is adapted to process digital data and to calculate a digital compensation voltage value Corr, and wherein said compensation circuit comprises a digital/analogue converter, which receives said digital compensation voltage value Corr and supplies an corresponding analogue value Ucorr to a series resistor connected in parallel with an output of said sensor.

12. A circuit according to claim 7, wherein said compensation circuit is adapted to inactivate said closed-loop servo control and to apply a constant value of said compensation current, independent of the values of said output signal, if said absolute value of said variation is greater than said predetermined comparison value.

13. A circuit according to claim 12, wherein said constant value corresponds to a mean value calculated for at least one sampling moment during which said closed-loop servo control is active.

14. A circuit according to claim 7, wherein said detection circuit comprises an analogue/digital converter which receives said output signal and is adapted to measure, store and process said values of said output signal in digital form.

15. A device for measuring a pressure value, called the cylinder pressure, prevailing in a cylinder chamber of a piston engine such as a heat engine, comprising a piezoelectric sensor and a circuit for processing a signal supplied by said piezoelectric sensor, wherein said processing circuit is a circuit according to claim 7.

* * * * *